(12) United States Patent
Campbell et al.

(10) Patent No.: US 8,918,700 B2
(45) Date of Patent: Dec. 23, 2014

(54) APPARATUS AND METHOD FOR CONTROLLING ACCESS TO A MEMORY DEVICE

(71) Applicant: ARM Limited, Cambridge (GB)

(72) Inventors: Michael Andrew Campbell, Cambridge (GB); Thomas Kelshaw Conway, Cambridge (GB)

(73) Assignee: ARM Limited, Cambridge (GB)

( * ) Notice: Subject to any disclaimer, the term of this patent is extended or adjusted under 35 U.S.C. 154(b) by 72 days.

(21) Appl. No.: 13/764,003

(22) Filed: Feb. 11, 2013

(65) Prior Publication Data

US 2014/0229793 A1 Aug. 14, 2014

(51) Int. Cl.
*G11C 29/00* (2006.01)
*G06F 11/10* (2006.01)

(52) U.S. Cl.
CPC .................................. *G06F 11/1012* (2013.01)
USPC .......................................... 714/764; 714/704

(58) Field of Classification Search
CPC ............ G06F 11/1102; G06F 11/1072; G06F 11/1048; H03M 13/03; H03M 13/1515
USPC ..................... 714/48, 774, 705, 755, 764, 704
See application file for complete search history.

(56) References Cited

U.S. PATENT DOCUMENTS

| 7,249,289 B2 * | 7/2007 | Muranaka et al. ............... 714/48 |
| 8,122,323 B2 * | 2/2012 | Leung et al. .................... 714/774 |
| 8,381,047 B2 * | 2/2013 | Hassan et al. .................. 714/705 |
| 8,762,798 B2 * | 6/2014 | Hu et al. ......................... 714/704 |
| 2005/0015698 A1 | 1/2005 | Kim et al. |
| 2009/0241008 A1 * | 9/2009 | Kim et al. ...................... 714/755 |

FOREIGN PATENT DOCUMENTS

| JP | H10-11905 | 1/1998 |
| JP | 2009-282923 | 12/2009 |
| JP | 2010-218661 | 9/2010 |

OTHER PUBLICATIONS

D. H. Yoon et al, "Virtualized ECC: Flexible Reliability in Main Memory" IEEE, Jan. 2011, pp. 11-19.
UK Search Report issued Jun. 20, 2014 in GB 1400367.7, 3 pages.

* cited by examiner

*Primary Examiner* — David Ton
(74) *Attorney, Agent, or Firm* — Nixon & Vanderhye P.C.

(57) ABSTRACT

An apparatus includes encoding circuitry to generate code words for storage in a memory device. Decoding circuitry is responsive to a read transaction to decode one or more code words read from the memory device in order to generate read data for outputting in response to the read transaction. The decoding circuitry comprises error correction circuitry configured, for each read code word, to perform an error correction process to detect and correct errors in up to P symbols of the code word, where P is dependent on the number of ECC symbols in the code word. Error tracking circuitry determines error quantity indication data indicative of the errors detected by the error correction circuitry, and in response to the error quantity indication data indicating that an error threshold condition has been reached, the apparatus transitions from a normal mode of operation to a safety mode of operation.

15 Claims, 6 Drawing Sheets

APPARATUS AND METHOD FOR CONTROLLING ACCESS TO A MEMORY DEVICE

BACKGROUND OF THE INVENTION

1. Field of the Invention

The present invention relates to an apparatus and method for controlling access to a memory device, and in particular for controlling access to a memory device where error correction codes are added to data to be stored in the memory device in order to provide error correcting capabilities when the data is subsequently retrieved from the memory device.

2. Description of the Prior Art

It is known to use error correction codes (ECC) in order to protect a data packet from various forms of data corruption. Typically, this is achieved by treating the data packet as a series of data symbols of fixed length, and then adding a number of ECC symbols so that the data symbols and ECC symbols collectively form a code word. Using such a technique, if m ECC symbols are added when forming the code word, then up to m/2 randomly located symbol errors can be located and corrected within the code word. There are various known ECC coding techniques for generating the symbols of the code word. For example, one technique uses Reed Solomon codes, these codes being based on Galois field mathematics and having properties which make them suitable for hardware implementation.

One practical application for such an ECC coding technique is in memory devices, for example memory devices using DRAM (Dynamic Random Access Memory). One known arrangement of such a memory device involves providing a number of Dual Inline Memory Modules (DIMMs), where each DIMM consists of a number of DRAM chips on a circuit board, including at least one chip reserved for storing ECC information. Often, such a memory device is accessed via burst access operations, each burst comprising a plurality of beats, and the DRAM chips of the DIMM being accessed during each beat. In such an arrangement, it is known to treat the entirety of the data to be written to the memory device via a burst write access as forming the data packet, with a plurality of ECC codes then being generated to add to that data packet in order to form the code word. As mentioned earlier, if the code word includes m ECC symbols, then up to m/2 randomly located symbol errors can be corrected when the data is subsequently read from the memory via a burst read access.

There are various applications where data stored in the memory device may be subjected to such ECC coding techniques. One particular example is in Reliability, Availability, Serviceability (RAS) critical applications such as data server applications, where the use of such techniques provides greater reliability and availability of service.

When the memory device is arranged as discussed earlier by employing a number of DIMMs, it is easy to replace any one of the DIMMs in the event of a failure. In particular, if one or more individual DRAM chips within a DIMM fail, then that can be notified to an entity responsible for managing the memory device, and the relevant DIMM can be replaced. Accordingly, current ECC coding techniques are targeted at maintaining service until a failed module can be replaced.

However, such memory devices cannot always be deployed in convenient locations, and accordingly there can be some delay in replacing a failed DIMM. During such time, it would be preferable for the memory device to continue to be operational. Whilst one known way to achieve this is to provide one or more redundant blocks of memory, which can be switched in in the event of a failure, this obviously increases the size and cost of the memory device, and is not appropriate in many applications.

Furthermore, it is increasingly the case that low cost, low power, servers are being built with solder/down memory parts. Unlike the above arrangement that uses replaceable DIMM modules, once such a memory device is assembled, it cannot be maintained in a similar fashion, and accordingly once sufficient memory failures have accumulated past the capability of the ECC protection scheme, the memory device is rendered unusable. It would accordingly be desirable to prolong the usability of such memory devices.

The paper "Virtualised ECC: Flexible Reliability in Main Memory", by Doe Hyun Yoon et al, Micro, IEEE, Volume 31, Issue 1, pages 11-19 (Digital Object identifier 10.1109/ MM.2010.103) describes a system in which an operating system may decide, when allocating a portion of main memory to a particular application, how to apportion that allocated memory portion between the storage of data and the storage of related ECC information, with the goal of maintaining a constant error protection rate without requiring dedicated memory area for ECC storage.

SUMMARY OF THE INVENTION

Viewed from a first aspect, the present invention provides an apparatus for controlling access to a memory device configured to store code words, the apparatus comprising: encoding circuitry responsive to a write transaction to generate one or more code words for storage in the memory device, each code word comprising a plurality of symbols, said plurality of symbols comprising data symbols and associated error correction code (ECC) symbols; decoding circuitry responsive to a read transaction to decode one or more code words read from the memory device in order to generate read data for outputting in response to the read transaction, the decoding circuitry comprising error correction circuitry configured, for each read code word, to perform an error correction process to detect and correct errors in up to P symbols of said code word, where P is dependent on the number of ECC symbols in the code word; and error tracking circuitry configured to determine error quantity indication data indicative of the errors detected by the error correction circuitry; in response to the error quantity indication data indicating that an error threshold condition has been reached, the apparatus being caused to transition from a normal mode of operation to a safety mode of operation, in said safety mode of operation the encoding circuitry being configured such that the number of symbols in each code word generated by the encoding circuitry is no greater than in the normal mode of operation but each code word has a higher ratio of ECC symbols to data symbols than in said normal mode of operation.

In accordance with the present invention, error tracking circuitry is used to determine error quantity indication data indicative of the amount of errors occurring within code words read from the memory device, this information being obtained from the error detection and correction activity of the error correction circuitry within the decoding circuitry of the apparatus. If a situation arises where the error quantity indication data indicates that an error threshold condition has been reached, the apparatus then is made to transition from its normal mode of operation to a safety mode of operation. In the safety mode of operation, the encoding circuitry is reconfigured such that each generated code word contains no more symbols than were contained in each code word generated during the normal mode of operation, but each code word has a higher ratio of ECC symbols to data symbols than in the normal mode of operation.

As a result, the effective data capacity of the memory device is decreased, since the actual amount of the data contained within each code word stored to the memory device is decreased. However, the increased ratio of ECC symbols to data symbols provides an increased robustness to errors, and hence allows a memory device that might otherwise be unusable (due to the number of errors exceeding the error correction capabilities when in the normal mode of operation) to continue to be used in the safety mode of operation, albeit with a lower effective data storage capacity. Hence, the safety mode of operation provides a safe operating mode for the memory device with increased reliability and stability. In a memory device that uses replaceable modules such as the earlier described DIMM arrangement, the use of such a safety mode may allow the memory device to continue to function whilst awaiting replacement of the relevant DIMM. Similarly, for a memory device constructed with solder down memory parts that are non-replaceable, such a safety mode of operation will allow the memory device to continue to function, albeit with a reduced capacity, in situations where the memory device would otherwise be rendered unusable.

The memory device can be constructed in a variety of ways. However, in one embodiment the memory device comprises a plurality of memory regions, and the apparatus is configured to allocate a first subset of the memory regions for storing the data symbols of each code word and to allocate a second subset of the memory regions for storing the ECC symbols of each code word. In such an embodiment, when the apparatus is caused to transition from the normal mode of operation to the safety mode of operation, the apparatus may be configured to alter which memory regions are within the first subset and the second subset having regards to the higher ratio of ECC symbols to data symbols that is employed when in the safety mode of operation. In particular, the number of memory regions within the first subset used to store data symbols can be reduced when in the safety mode of operation.

When the number of memory regions within the first subset is decreased, the number of memory regions within the second subset can be correspondingly increased, so that the same total number of symbols is stored within each code word written into the memory device.

However, in an alternative embodiment, if it can be determined that one or more of the memory regions is exhibiting a failure condition, such that that region can no longer reliably store data and each symbol read from that memory region needs correcting using the ECC symbols, then a decision can be taken to exclude any such failing memory region from use in the safety mode of operation. There are a number of ways in which such a situation can be detected. However, in one embodiment the error quantity indication data identifies error quantity information for each memory region, and if the error quantity indication data indicates that an error threshold condition has been reached, and identifies at least one memory region that is exhibiting a failure condition, that at least one memory region is excluded from use in the safety mode of operation. Hence, the number of symbols within each code word as stored in the memory device is reduced when in the safety mode of operation.

When entering the safety mode of operation, both the encoding circuitry and the decoding circuitry need to be reconfigured to take account of the change in ratio between the ECC symbols and data symbols within each code word. In situations where the same number of symbols are contained within each code word when operating in the safety mode of operation or the normal mode of operation, and hence any decrease in the number of memory regions used to store data symbols results in a corresponding increase to the number of memory regions used to store ECC symbols, this can be readily achieved by identifying to the encoding circuitry and the decoding circuitry the number of data symbols within each code word.

When operating in accordance with the embodiment discussed earlier, where one or more regions is excluded from use in the safety mode of operation, and hence the number of symbols in the code word as actually written into, and read from, the memory device decreases when in the safety mode of operation, there are a number of ways in which the operation of the encoding circuitry and the decoding circuitry can be managed. However, in one particular embodiment, in the safety mode of operation, the encoding circuitry is configured to generate a code word having the same number of symbols as in the normal mode of operation, with an ECC symbol being associated with each of said at least one excluded memory regions, and the ECC symbol associated with each of said at least one excluded memory regions not being written to the memory device. Hence, in such an embodiment, the encoding circuitry merely needs to be reconfigured to take into account the reduced number of data symbols in each code word, but the same basic process as used in the normal mode is still used to generate the code word since the overall number of symbols is unchanged. The apparatus is then arranged to ensure that the ECC symbols associated with any excluded memory regions are not written to the memory device.

Similarly, in one embodiment, when each code word is read from said memory device in the safety mode of operation, dummy data is added at the symbol positions associated with each of said at least one excluded memory regions, such that each code word decoded by the decoding circuitry has the same number of symbols as in the normal mode of operation. Hence, the decoding circuitry also performs the same process as in the normal mode of operation, and merely needs to be reconfigured to take account of the reduced number of data symbols within each code word that it decodes.

The memory regions can take a variety of forms. However, in one embodiment the memory device comprises a plurality of memory chips, with each memory chip forming one of the memory regions. The memory chips may be provided in one or more DIMMs, or may be non-replaceable.

Whilst there are a number of ways in which the number of data symbols within each code word may be reduced when operating in the safety mode of operation, it is implementationally more straight forward (both in terms of the operation of the encoding circuitry and decoding circuitry, and in the management of available memory and translation of accesses to memory) to reduce the number of data symbols by a factor of 2. In particular, in one embodiment, in said safety mode of operation the encoding circuitry is configured such that each code word generated by the encoding circuitry has half the number of data symbols as are provided within each code word generated by the encoding circuitry in the normal mode of operation.

There are a number of ways in which the apparatus can be configured to operate in either the normal mode of operation or the safety mode of operation. However, in one embodiment the apparatus further comprises mode control storage configured to store configuration data used to control operation of the apparatus, initial configuration data within the mode control storage causing the apparatus to operate in the normal mode of operation, but in response to the error quantity indication data indicating that said error threshold condition has been reached, the configuration data being updated within the mode control storage to cause the apparatus to enter the safety mode of operation.

There are a variety of ways in which the configuration data can be provided to the mode control storage. However, in one embodiment, the error tracking circuitry is configured to output the error quantity indication data to control circuitry, and the mode control storage is configured to update said configuration data upon receipt of control signals from the control circuitry in response to the control circuitry determining that the error quantity indication data indicates that said error threshold condition has been reached. Hence, in this embodiment, the control circuitry is arranged to determine when the error quantity indication data indicates that the error threshold condition has been reached.

However, in an alternative embodiment, the error tracking circuitry is configured to determine when the error quantity indication data indicates that said error threshold condition has been reached, and upon such determination to output a trigger signal to control circuitry, and the mode control storage is configured to update said configuration data upon receipt of control signals generated by the control circuitry in response to the trigger signal. Accordingly, in this embodiment, the error tracking circuitry determines when the error quantity indication data indicates that the error threshold condition has been reached, and the control circuitry responds to a trigger signal issued by the error tracking circuitry upon detection of the error threshold condition.

In both of the above embodiments, the control circuitry may be provided either within the apparatus, or external to the apparatus. In one embodiment, the apparatus takes the form of a memory controller unit, and in one particular embodiment the control circuitry is provided external to that memory controller unit. Such an approach enables the control circuitry to coordinate with other elements of the system in which the apparatus is employed, so as to coordinate any activities that are required prior to transitioning the apparatus from the normal mode of operation to the safety mode of operation. For example, it may be necessary to flush the current contents of the memory device from the memory device, store them temporarily in another memory within the system, and then, following entry into the safety mode of operation, to rewrite that data into the memory device using the new code word format for the safety mode of operation. Sometimes, it may not be necessary to flush the memory device, but it may still be appropriate to overwrite all of the data in the memory device with some default data so as to place the memory device into the default state prior to transition from the normal mode of operation to the safety mode of operation.

Whilst in one embodiment the apparatus may be arranged to operate in only the normal mode of operation or the safety mode of operation, in other embodiments additional modes of operation may be provided. For example, in one embodiment, the error tracking circuitry is configured in the safety mode of operation to continue to maintain error quantity indication data indicative of the errors detected by the error correction circuitry. In response to the error quantity indication data indicating that a further error threshold condition has been reached, the apparatus is then caused to transition from said safety mode of operation to a further safety mode of operation, in said further safety mode of operation the encoding circuitry being configured such that the number of symbols in each code word generated by the encoding circuitry is no greater than in the safety mode of operation but each code word has a higher ratio of ECC symbols to data symbols than in said safety mode of operation. Hence, such an approach allows another level of fallback to be provided, where the memory device can still operate reliably and correctly, albeit with an even further reduced effective capacity.

In one embodiment, in said further safety mode of operation the encoding circuitry is configured such that each code word generated by the encoding circuitry has half the number of data symbols as are provided within each code word generated by the encoding circuitry in the safety mode of operation.

Viewed from a second aspect, the present invention provides a method of controlling access to a memory device configured to store code words, the method comprising: generating, in response to a write transaction, one or more code words for storage in the memory device, each code word comprising a plurality of symbols, said plurality of symbols comprising data symbols and associated error correction code (ECC) symbols; decoding, in response to a read transaction, one or more code words read from the memory device in order to generate read data for outputting in response to the read transaction, the decoding step comprising, for each read code word, performing an error correction process to detect and correct errors in up to P symbols of said code word, where P is dependent on the number of ECC symbols in the code word; determining error quantity indication data indicative of the errors detected by the error correction process; and in response to the error quantity indication data indicating that an error threshold condition has been reached, transitioning the apparatus from a normal mode of operation to a safety mode of operation, in said safety mode of operation the encoding step being arranged such that the number of symbols in each generated code word is no greater than in the normal mode of operation but each code word has a higher ratio of ECC symbols to data symbols than in said normal mode of operation.

Viewed from a third aspect, the present invention provides an apparatus for controlling access to a memory device configured to store code words, the apparatus comprising: encoding means, responsive to a write transaction, for generating one or more code words for storage in the memory device, each code word comprising a plurality of symbols, said plurality of symbols comprising data symbols and associated error correction code (ECC) symbols; decoding means, responsive to a read transaction, for decoding one or more code words read from the memory device in order to generate read data for outputting in response to the read transaction, the decoding means comprising error correction means for performing, for each read code word, an error correction process to detect and correct errors in up to P symbols of said code word, where P is dependent on the number of ECC symbols in the code word; error tracking means for determining error quantity indication data indicative of the errors detected by the error correction means; in response to the error quantity indication data indicating that an error threshold condition has been reached, the apparatus being caused to transition from a normal mode of operation to a safety mode of operation, in said safety mode of operation the encoding means generating code words such that the number of symbols in each generated code word is no greater than in the normal mode of operation but each code word has a higher ratio of ECC symbols to data symbols than in said normal mode of operation.

BRIEF DESCRIPTION OF THE DRAWINGS

The present invention will be described further, by way of example only, with reference to embodiments thereof as illustrated in the accompanying drawings, in which.

DESCRIPTION OF EMBODIMENTS

Figure 1:
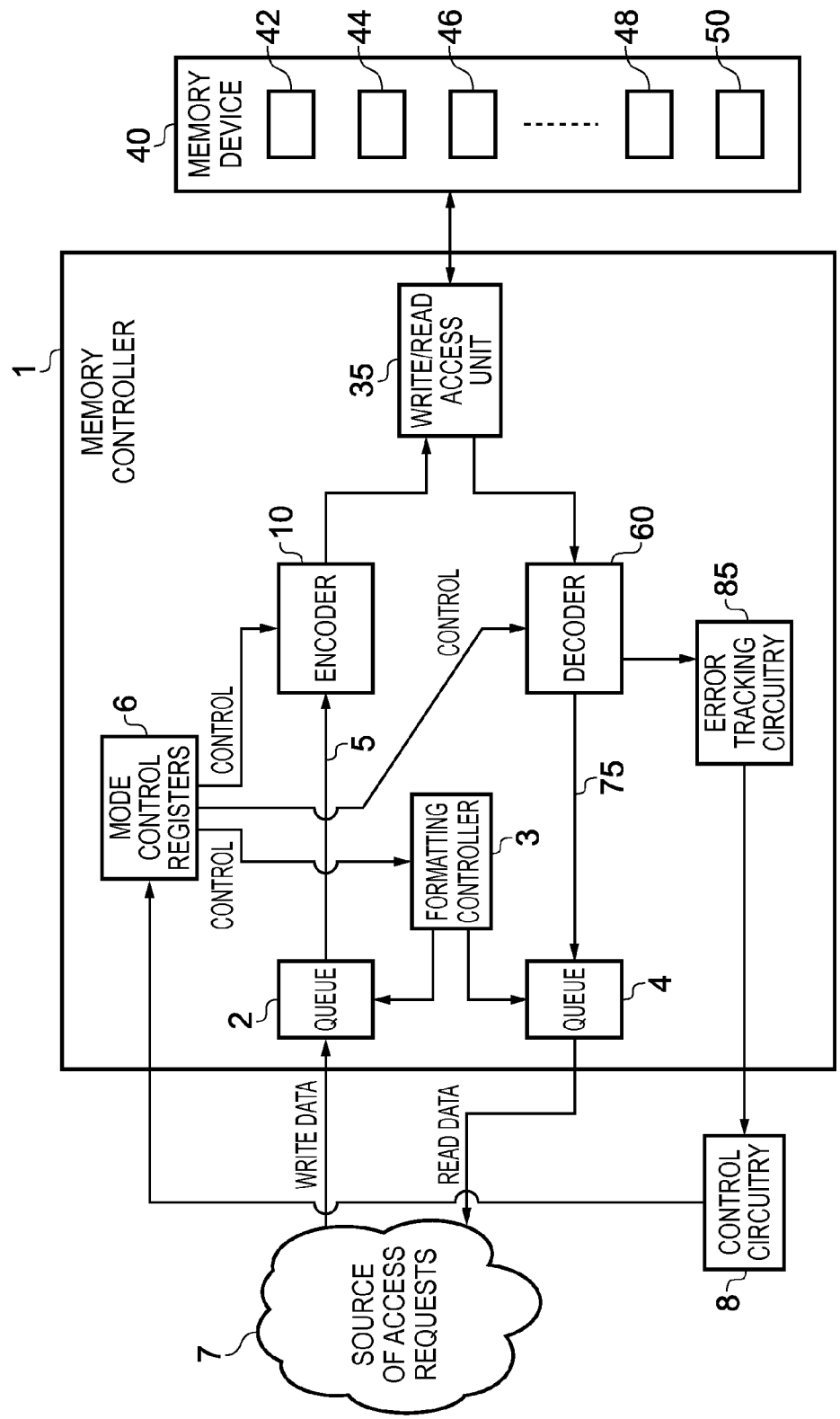
FIG. 1 is a block diagram illustrating an apparatus in accordance with one embodiment.

FIG. 1 is a block diagram of a data processing apparatus in accordance with one embodiment. A source of access requests 7 is arranged to issue write transactions and read transactions to the memory controller 1, in order to write data into the memory device 40 and read data from the memory device 40. The source of access requests 7 can take a variety of forms, but in one embodiment an interconnect structure within a System-on-Chip (SoC) will have a variety of devices coupled thereto, for example a central processing unit, a graphics processing unit, etc. and any one of those devices may issue write or read transactions via the interconnect structure, the interconnect structure then forwarding those transactions to the memory controller 1.

Both a control path and a data path are provided for write and read transactions, with the control path being used to identify the relevant control information for the transactions, such as the address to be accessed, the size of the access, etc. As will be well understood by those skilled in the art, individual transactions will typically be buffered internally within the memory controller, and a selection mechanism will be used to select the order in which the transactions are processed. In FIG. 1, for simplicity, that control path has been omitted. However, as shown in FIG. 1, both the write data path and the read data path are shown. In particular, the write data associated with a write transaction will be forwarded from the source of access requests 7 for temporary storage within the queue 2. Subsequently, when the write transaction is selected for processing, the relevant write data will be read out from the queue 2 under the control of the formatting controller 3, in order to provide the data for one or more burst accesses required to write into the memory device the data specified by the write transaction.

In the embodiment shown in FIG. 1, the memory device 40 consists of a plurality of DRAM chips 42, 44, 46, 48, 50, and both write and read accesses to the memory device 40 are performed as burst accesses comprising multiple beats. The memory device may be formed of one or more replaceable DIMMs, or alternatively the chips may be soldered-down, non-replaceable, components. The read/write access unit 35 is used to access the memory device 40 during each beat of a burst access. Typically, for a burst write operation, data will be written into each of the chips 42, 44, 46, 48, 50 during each beat, and similarly during the burst read operation data will be read from each of the chips during each beat.

The encoder 10 receives over path 5 the write data for a burst write operation, and is used to generate ECC symbols to be associated with the data of that burst write operation. More details of the operation of the encoder 10 will be provided later with reference to FIG. 2, but in summary the encoder treats the write data received for the burst write operation as a series of data symbols, and generates a number of ECC symbols to be combined with the data symbols in order to form a code word for storage within the memory device 40. Thereafter, the code word is forwarded to the write/read access unit 35, from where the various symbols of the code word are written into the memory device 40. As discussed earlier, the symbols forming the code word will be written into the memory device over a series of beats, with each of the chips 42, 44, 46, 48, 50 being accessed during each beat. Typically one or more of the chips will be reserved for the storage of ECC symbols.

When processing a read transaction, the write/read access unit 35 will be employed to perform a burst read operation in order to access one or more code words from the memory device 40, and again typically each chip will be accessed during every beat of that burst read operation. Each read code word is passed through the decoder 60, the decoder being used to extract the data requested by the read transaction from the code word received from the read/write access unit 35. As part of this process, error correction circuitry is used to detect any errors within the symbols of the code word, and to use the ECC information to correct those errors. More details of the operation of the decoder 60 will be provided later with reference to FIG. 2. The decoded read data is then output over path 75 into the queue 4, from where it is subsequently output to the source of access requests 7 under the control of the formatting controller 3. In particular, the formatting controller will determine when all of the read data specified by the read transaction is available within the queue, and will then output that read data to the source of access requests 7.

Error tracking circuitry 85 receives information from the decoder about the errors detected by the decoder 60. In particular, the error tracking circuitry determines error quantity indication data indicative of the number of errors detected by the decoder. This information is used to determine whether an error threshold condition has been reached or not. The error threshold condition can be set in a variety of ways, for example it may be set to identify a number of errors where the memory device 40 has not yet failed but is close to failure, or alternatively may be set to indicate a number of errors where the memory device has actually failed (i.e. where the number of errors exceeds the error correction capabilities of the decoder, given the number of ECC symbols in each code word).

The error tracking circuitry 85 may be arranged to determine the presence of the error threshold condition itself based on the error quantity indication data, and on detection of the error threshold condition to then issue a trigger signal to the control circuitry 8, for example in the form of an asserted interrupt signal. Alternatively it may be arranged to merely output the error quantity indication data to the control circuitry 8, for the control circuitry 8 to then determine whether or not the threshold condition has been reached.

The control circuitry 8 may take a variety of forms, and may be provided either internally within the memory controller 1, or (as shown in the example of FIG. 1) may be provided externally to the memory controller. In one particular embodiment, the control circuitry may itself form part of the source of the access requests 7. For example, considering the earlier specific example where the source of access requests takes the form of an interconnect structure and a variety of devices connected to that interconnect structure, the control circuitry may be provided by a central processing unit (CPU) connected to the interconnect, the CPU being configured to run an analysis routine to analyse the error quantity indication data and determine the presence or absence of the threshold condition. Alternatively, the control circuitry may take the form of an interrupt handler executed by the CPU, that is responsive to an interrupt signal issued by the error tracking circuitry 85 to execute an interrupt handling routine in order to determine how to respond to the interrupt issued by the error tracking circuitry.

In response to the error threshold condition having been detected, the control circuitry 8 will take a series of steps in order to cause the memory controller 1 to be transitioned from its normal mode of operation to a safety mode of operation. These steps will include taking any steps necessary to save any required data within the memory device 40 to a separate memory within the system (by issuing a series of read transactions to the memory controller to cause that data to be read out). Alternatively, if the data does not need to be saved, the data in the memory device may merely be reset to some known state. The control circuitry will then arrange for the memory controller 1 to be reset, during which process it will issue configuration data to the mode control registers 6 within the memory controller.

The content of the mode control registers is used to disseminate control information to the elements within the memory controller, such as the encoder 10, decoder 60 and formatting controller 3. In particular, when entering the safety mode of operation, the encoder will be reconfigured so that an increased ratio of ECC symbols to data symbols is included within the code word generated by the encoder. This will be achieved by reducing the number of data symbols within each code word, and mode control information within the mode control register 6 will be output to the encoder to identify the number of data symbols to be provided within each code word. Given that the number of data symbols within each code word is reduced, this will mean that the amount of write data included in each code word will be reduced, and accordingly this will necessitate an increase the number of code words required to be generated for each write transaction. Accordingly, the formatting controller 3 receives control information from the mode control registers to identify the amount of write data which should be read from the queue for each burst write operation performed to process the write transaction.

Similarly, on the decoding side, the decoder 60 will need information about the number of data symbols within each code word received from the write/read access unit 35 in order to correctly decode each code word in order to produce the read data output over path 75 to the queue 4. Formatting controller 3 will also use the control information provided from the mode control registers 6 to determine how to arrange the data received from each burst read access operation in order to output the required read data for each read transaction back to the source of access requests 7.

Figure 2:
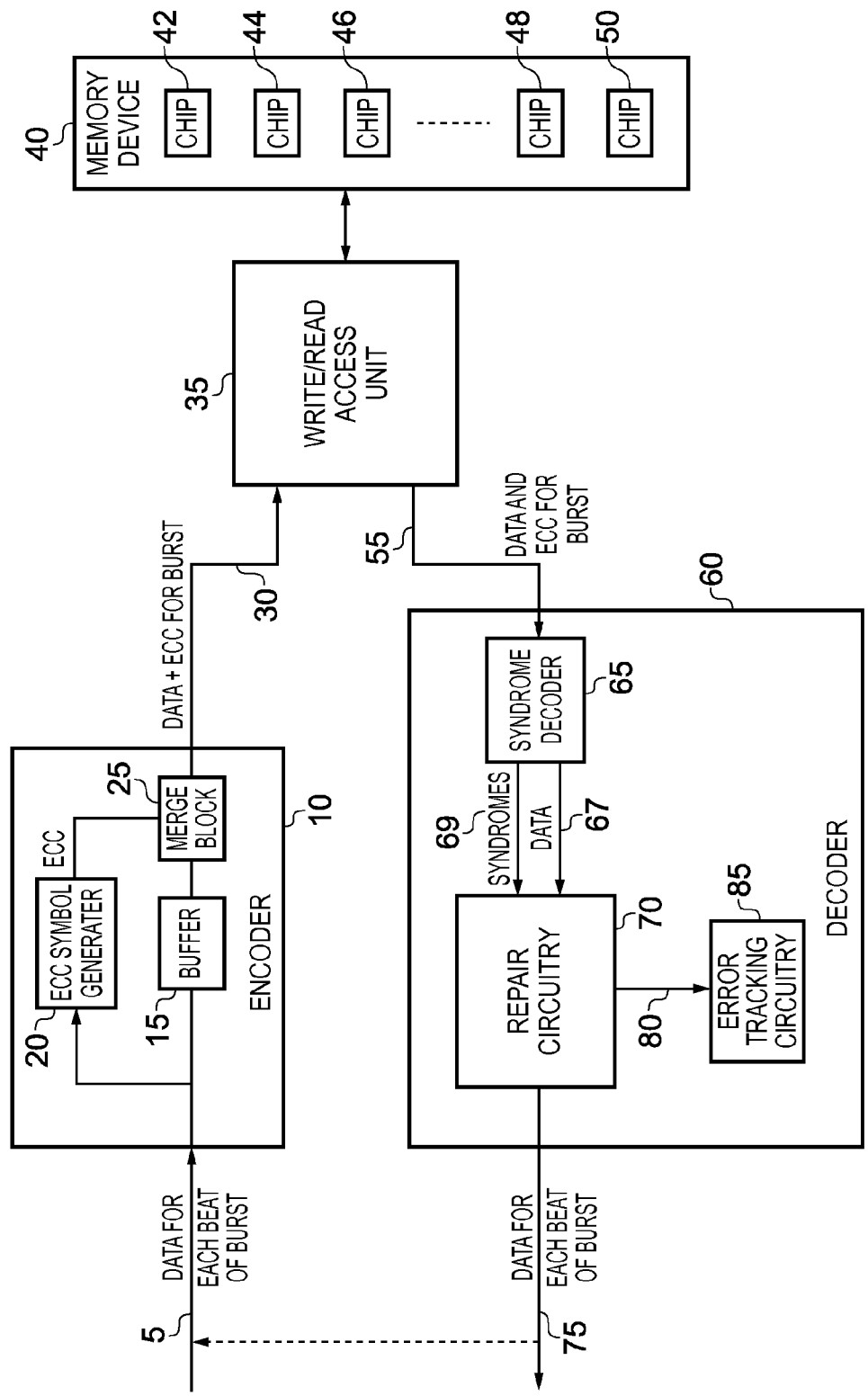
FIG. 2 is a block diagram illustrating the operation of the encoder and decoder of FIG. 1 in accordance with one embodiment.

FIG. 2 is a block diagram illustrating the operation of the encoder 10 and decoder 60 of FIG. 1 in accordance with one embodiment. The encoder 10 is used to generate ECC symbols to be associated with the data of a burst write operation. For each beat, the data provided over path 5 for that beat is stored within the buffer 15, but in addition is provided to the ECC symbol generator 20. The ECC symbol generator 20 will generate a predetermined number of ECC symbols based on the received data for the first beat. Thereafter, as the data for each subsequent beat is received and stored within the buffer 15, that data will also be provided to the ECC symbol generator 20, causing it to update the predetermined number of ECC symbols having regard to the latest data received. By the time the data for all of the beats of the burst write operation have been received and buffered, the predetermined number of symbols generated by the ECC symbol generator 20 will then be ECC symbols that are associated with the entire data of the burst write operation.

The predetermined number of ECC symbols produced by the ECC symbol generator will be dependent on the particular implementation. However, in one embodiment, the number of ECC symbols generated is the same as the number of beats in the burst write access. Hence, considering a particular example where the burst write access contains eight beats, then the ECC symbol generator 20 will generate eight ECC symbols.

In one particular embodiment, the encoder 10 generates a Reed Solomon code word based on the received write data of the burst, encoding that write data using n data symbols (containing the write data) and an associated m ECC symbols. The operation of the ECC symbol generator to generate the ECC symbols to be associated with the write data will be well understood by those skilled in the art, and accordingly will not be discussed further herein.

Once the ECC symbols have been generated by the ECC symbol generator 20, they are provided to the merge block 25 along with the data from the buffer 15, the merge block producing a sequence of symbols containing both the data symbols and the ECC symbols, which are provided over path 30 to the write/read access unit 35. From there, the various symbols are written into corresponding chips within the memory device 40. In particular, each chip will have a data lane associated therewith over which data is written into the chip, and read from the chip. The corresponding data from each beat will typically be written to the same chip over the associated data lane. At least one of the chips will typically be reserved for the storing of ECC symbols.

Having written the data into the memory device 40 using a burst write access as discussed above, data will also be read from the memory device via burst read accesses. In particular, when a burst read operation is performed, the data for each beat will be read by the write/read access unit 35 and forwarded to the decoder 60. Typically, each chip will be accessed during every beat, and will provide a data unit (for example a byte or a nibble of data) over its associated data lane to the write/read access unit 35, from where that data will be passed over path 55 to the decoder 60.

The read data is initially passed to syndrome decoder 65, which is arranged to determine syndrome information from the data symbols and associated ECC symbols. The syndrome decoder generates syndrome information by analysing all of the read symbols (both the data symbols and the ECC symbols) associated with the burst read access. In particular, the syndrome decoder divides those read symbols by the generator polynomial used to create the ECC symbols within the encoder 10. If the result is zero, then no errors have been detected, and the data output over path 67 can be propagated out over path 75 from the repair circuitry 70 without any modification. However, if the result is non-zero, then the resultant syndrome information is sent over path 69 along with the data over path 67, for use by the repair circuitry 70 in seeking to locate and correct any read symbols containing errors.

The operation of the repair circuitry 70 will be discussed in more detail later, but in essence the repair circuitry 70 seeks to solve an error location polynomial using the syndrome information as an input. If the error location polynomial is solved, then each read symbol containing an error is identified by determining the roots of the solved error location polynomial. The identified roots and the syndrome information can then be used to determine the corrected values of the read symbols that have been identified as being in error.

In one embodiment, the repair circuitry assumes that the read symbols containing errors are randomly distributed amongst the plurality of read symbols of the burst read access. Assuming there are m ECC symbols read from the memory device 40 during the burst read operation, the repair circuitry will be able to solve the error location polynomial provided there are no more than m/2 symbols in error.

As mentioned earlier when discussing FIG. 1, the error tracking circuitry 85 determines error quantity indication data indicative of the number of errors detected by the repair circuitry (the repair circuitry 70 in combination with the syndrome decoder 65 forming the earlier mentioned error correction circuitry of the decoder). This information can then be used to determine when it is appropriate to switch the memory controller into the safety mode of operation, having regards to some predetermined error threshold condition indicating failure, or approaching failure, of at least one chip of the memory device.

Optionally, the error quantity indication data may also identify the number of errors detected within each chip, and accordingly can identify when at least one chip is exhibiting a failure condition. In one embodiment, if it is determined that it is appropriate to enter the safety mode of operation, the memory controller 1 may also be configured to exclude one or more chips that have been identified as exhibiting a failure condition from any future write and read operations (hence effectively reducing the size of each code word written into, and read from, the memory device). This embodiment will be discussed in more detail later with reference to FIG. 5.

As a further optional enhancement, in situations where the error quantity indication data also identifies the number of errors within each chip, the error tracking circuitry 85 may be arranged to delay onset of the failure condition by marking as an erasure region any chip that is determined as having an approaching failure condition. That erasure memory region information can then be output to the repair circuitry for use during a subsequent burst read operation. In particular, once a chip has been set as an erasure memory region, then the repair region will subsequently treat each read symbol from that chip as a located read symbol containing an error. Accordingly, the distribution of read symbols containing errors is no longer treated as being entirely random, and this allows the number of read symbols containing errors to increase, whilst still enabling the error correction process performed by the repair circuitry 70 to identify and correct those errors. In particular, for a code word containing T ECC symbols, up to 2E+F symbol errors can be corrected, where E is a randomly located symbol error and F is a known location symbol error. Hence, at a maximum, such an approach allows the repair circuitry to locate and correct up to m symbols containing errors (i.e. to correct the same number of symbols as there are ECC symbols in the burst read operation), provided all of those symbols reside within a particular chip (or chips) set as the erasure memory region.

The above approach of selectively marking one or more chips as erasure memory regions can be used in the normal mode of operation to allow the memory device to operate for longer in the normal mode of operation before it requires switching into the safety mode of operation. Alternatively, or in addition, the marking of one or more chips as erasure memory regions can prolong the length of time that the memory device can operate in the safety mode of operation without failing. More details of the use of such erasure memory regions is provided within commonly owned, copending, U.S. patent application Ser. No. 13/681,789, the entire contents of which are hereby incorporated by reference.

Figure 3:
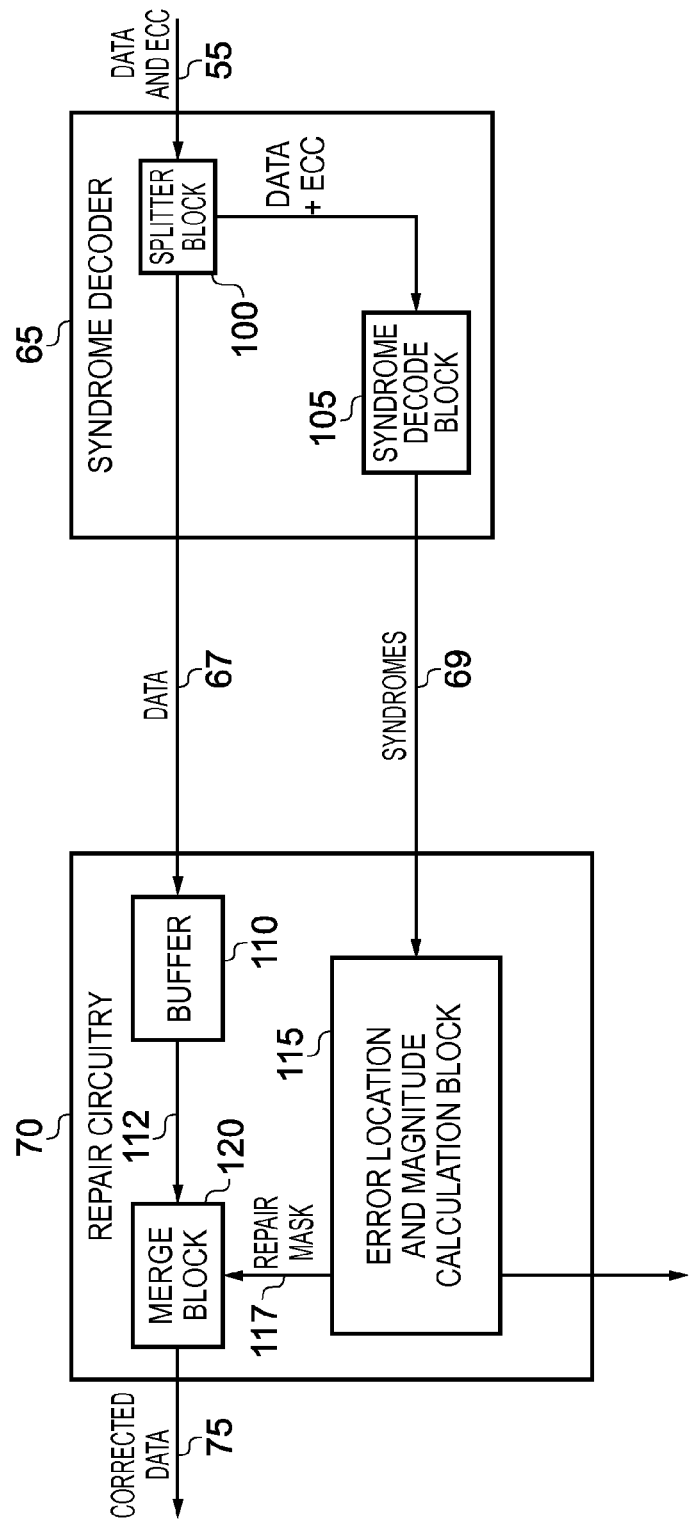
FIG. 3 is a block diagram illustrating in more detail components provided within the syndrome decoder and repair circuitry of FIG. 2 in accordance with one embodiment.

FIG. 3 illustrates in more detail components provided within the syndrome decoder 65 and the repair circuitry 70 in accordance with one embodiment. The syndrome decoder 65 includes a splitter block 100 which passes the data symbols over path 67 to the buffer 110 within the repair circuitry 70, but also routes both the data and the associated ECC symbols to the syndrome decode block 105, which is used to generate the syndrome information output over path 69. If the syndrome information is non-zero, this will cause the error location and magnitude calculation block 115 within the repair circuitry 70 to perform the earlier discussed process of seeking to solve the error location polynomial and, once solved, to then determine the roots of the solved error location polynomial in order to identify each read symbol containing an error. In addition, the error location and magnitude calculation block 115 will determine the corrected values for the located read symbols, and output that information as a repair mask over path 117. The repair mask is a vector that is the same size as the data of the read access stored within the buffer 110. This vector contains non-zero values in locations that correspond to errors, whilst all other locations contain zeros. The merge block 120 then receives both the repair mask over path 117 and the data from the buffer 110 over path 112 and corrects the errors in the received data by adding the received data to the repair mask using a Galois field adder (implementing an XOR function). This results in the generation of corrected data output over path 75.

Figure 4:
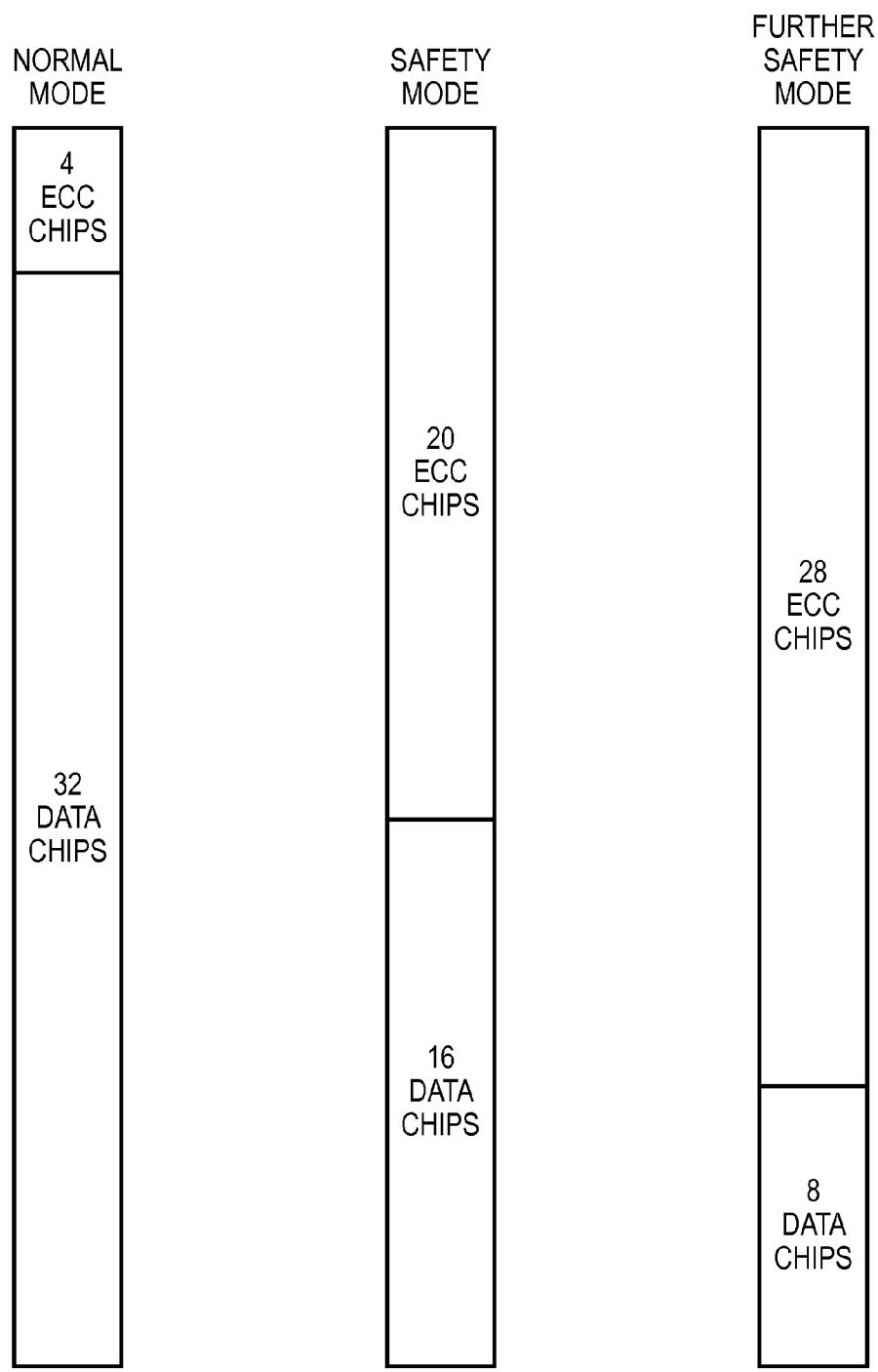
FIG. 4 is a diagram schematically illustrating how the chips of the memory device may be reallocated between the normal mode, the safety mode and further safety mode, in accordance with one embodiment.

FIG. 4 is a diagram schematically illustrating how the chips of the memory device 40 may be reallocated between the normal mode, the safety mode, and optionally a further safety mode, in accordance with one embodiment. In this example, it is assumed that the memory device comprises 36 chips, and that in the normal mode of operation 32 of those chips are allocated for the storage of data symbols, and 4 of those chips are allocated for the storage of ECC symbols. Hence up to 2 randomly located symbol errors (either data symbols or ECC symbols) per 4 ECC symbols can be detected and corrected. This allows up to two of the chips to fail before the memory device is rendered unusable.

In the embodiment illustrated in FIG. 4, it is assumed that when it is determined that the threshold condition has been reached, requiring transition of the memory controller to the safety mode of operation, all of the chips are reused in the safety mode of operation. In this embodiment, the number of data chips is reduced by a factor of two when entering the safety mode of operation, and in particular in the safety mode of operation 16 of the chips are allocated for the storage of data symbols. The remaining 20 chips are allocated for the storage of ECC symbols. Accordingly, it is now possible to detect and correct up to 10 randomly located symbol errors per 20 ECC symbols, allowing up to ten of the chips to fail before the memory device is rendered unusable.

Whilst in one embodiment the memory controller may be arranged to operate in only the normal mode of operation or the safety mode of operation, in other embodiments additional modes of operation may be provided. For example, in one embodiment, the error tracking circuitry 85 may be configured in the safety mode of operation to continue to maintain error quantity indication data indicative of the errors detected by the error correction circuitry within the decoder 60. Then, in response to the error quantity indication data indicating that a further error threshold condition has been reached, the memory controller may be caused to transition from the safety mode of operation to a further safety mode of operation, in the further safety mode of operation the encoder 10 being configured such that the number of symbols in each code word generated by the encoder is no greater than in the safety mode of operation but each code word has a higher ratio of ECC symbols to data symbols than in the safety mode of operation. Hence, such an approach allows another level of fallback to be provided, where the memory device can still operate reliably and correctly, albeit with an even further reduced effective capacity.

Such an embodiment is illustrated in FIG. 4, where in the further safety mode the number of data chips used for the storage of data symbols is reduced again by a factor of two, to result in 8 chips being allocated for the storage of data symbols. The remaining 28 chips are then allocated for the storage of ECC symbols, allowing up to 14 randomly located symbol errors to be corrected per 28 ECC symbols, allowing up to 14 of the chips to fail before the memory device is rendered unusable.

Figure 5:
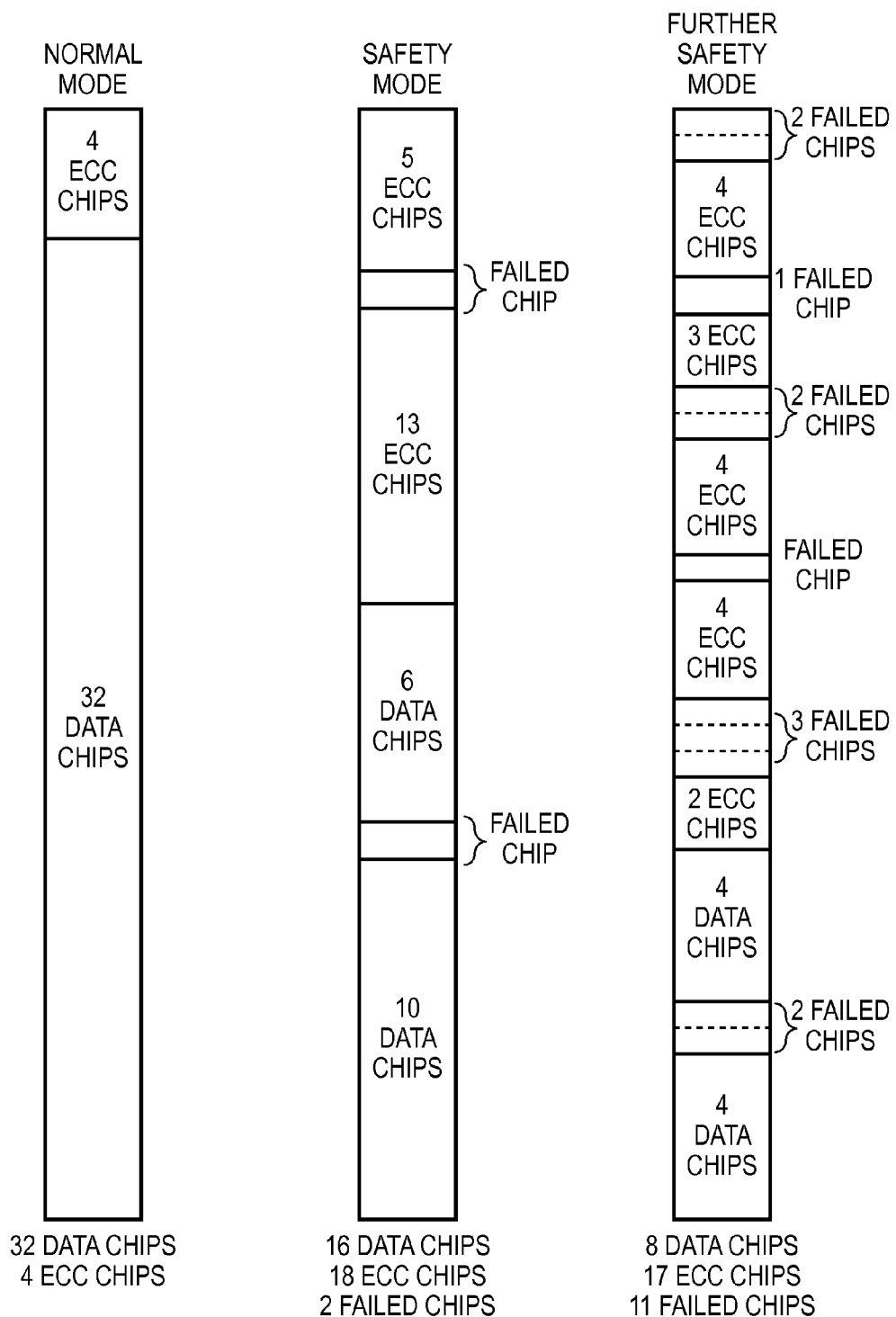
FIG. 5 is a diagram schematically illustrating how the chips of the memory device may be reallocated between the normal mode, the safety mode and further safety mode, in accordance with an alternative embodiment.

If the error quantity indication data allows individual failing chips to be identified, then in an alternative embodiment the allocations of FIG. 5 can be used. The normal mode is unchanged, and accordingly 32 of the chips are allocated for the storage of data symbols and 4 of the chips are allocated for the storage of ECC symbols. However, at the time the threshold condition is detected, it is assumed that the error quantity indication data identifies two of the chips as failing. Accordingly, when the safety mode is entered, 16 of the chips that have not failed are allocated for the storage of data symbols as before, but only 18 of the remaining chips are allocated for the storage of ECC symbols. The two failed chips are excluded from further use by the memory controller. Hence, in the safety mode of operation, failure of a further nine chips can be accommodated based on the amount of ECC symbol data within each code word.

In FIG. 5, it is assumed that the further safety mode of operation is entered at a time where a further nine chips have failed, and accordingly in the further safety mode 11 of the chips are excluded from use. Eight of the non-failing chips are allocated for the storage of data symbols, and the remaining 17 non-failing chips are allocated for the storage of ECC symbols. Hence, in the further safety mode of operation, failure of a further eight chips can be accommodated based on the amount of ECC symbol data within each code word.

When entering the safety mode of operation, both the encoder 10 and the decoder 60 need to be reconfigured to take account of the change in ratio between the ECC symbols and data symbols within each code word. In the embodiment of FIG. 4 where the same number of symbols are contained within each code word when operating in the safety mode of operation or the normal mode of operation, and hence any decrease in the number of chips used to store data symbols results in a corresponding increase to the number of chips used to store ECC symbols, this can be readily achieved by identifying to the encoding circuitry and the decoding circuitry the number of data symbols within each code word.

When operating in accordance with the embodiment of FIG. 5, where one or more chips is excluded from use in the safety mode of operation, and hence the number of symbols in the code word as actually written into, and read from, the memory device decreases when in the safety mode of operation, there are a number of ways in which the operation of the encoder 10 and the decoder 60 can be managed. However, in one particular embodiment, in the safety mode of operation, the encoder 10 is configured to generate a code word having the same number of symbols as in the normal mode of operation, with an ECC symbol being associated with each excluded chip, but that ECC symbol not being written to the memory device. Hence, in such an embodiment, the encoder 10 merely needs to be reconfigured to take into account the reduced number of data symbols in each code word, but the same basic process is still used to generate each code word since the overall number of symbols is unchanged. In particular the same generator polynomial is used to create the ECC symbols within the encoder 10.

Similarly, in one embodiment, when each code word is read from said memory device in the safety mode of operation, dummy data is added at the symbol positions associated with each excluded chip, such that each code word decoded by the decoder 60 has the same number of symbols as in the normal mode of operation. Hence, the decoding circuitry also performs the same process as in the normal mode of operation, and merely needs to be reconfigured to take account of the reduced number of data symbols within each code word that it decodes. In particular the same error location polynomial can be used.

Figure 6:
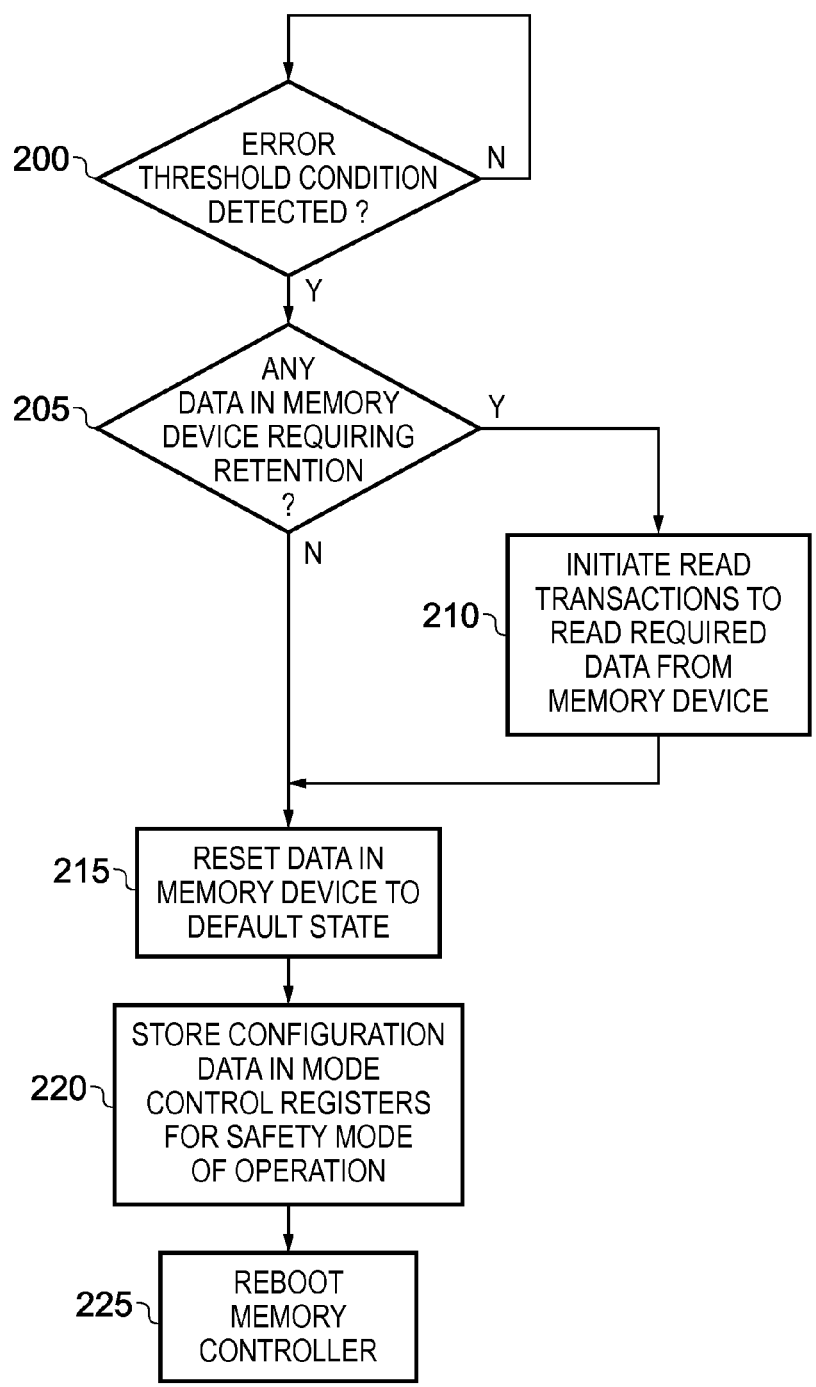
FIG. 6 is a flow diagram illustrating the operation of the control circuitry of FIG. 1 in accordance with one embodiment.

FIG. 6 is a flow diagram illustrating the operation of the control circuitry of FIG. 1 in accordance with one embodiment. At step 200, it is determined whether the error threshold condition has been detected. As discussed earlier, in one embodiment the control circuitry 8 may determine the presence of the error threshold condition directly, based on the error quantity indication data forwarded from the error tracking circuitry 85. However, in an alternative embodiment, the error tracking circuitry 85 may itself detect the presence of the error threshold condition, and in such an embodiment the control circuitry 8 will determine the presence of the error threshold condition upon receipt of a trigger signal from the error tracking circuitry, for example an interrupt signal issued by the error tracking circuitry 85 upon detection of the error threshold condition.

Following detection of the error threshold condition, the process proceeds to step 205, where the control circuitry determines whether there is any data in the memory device 40 that requires retaining prior to transitioning the memory controller 1 from the normal mode of operation to the safety mode of operation. In particular, once the memory controller has been transitioned to the safety mode of operation, the format of each code word stored within the memory device will be different, and accordingly any code words within the memory device 40 that contain data that needs to be retained will first need to be copied from the memory device before the mode of operation of the memory controller is changed.

If it is determined at step 205 that there is data that needs to be retained, then the process branches to step 210, where the control circuitry causes a series of read transactions to be issued to the memory controller 1 to cause the required data to be read from the memory device 40. Once the read data is received, it can be stored elsewhere within the system, for example in another area of memory provided within the system.

Following step 210, or directly following step 205 in the event that it is determined that there is not any data which requires retention, then the process proceeds to step 215, where the data in the memory device is reset to a default state. For example, this may be achieved by performing a series of write transactions in order to write known data values in the memory device, for example to store logic zero values within each storage location of the memory device. In some embodiments step 215 may not be required.

Following step 215, the process proceeds to step 220, where configuration data defining the safety mode of operation is stored within the mode control registers 6 of the memory controller 1, whereafter the memory controller is rebooted at step 225, which causes it to enter the safety mode of operation.

As will be apparent from the above description, the described embodiments provide a mechanism whereby a memory device that might otherwise become unusable, due to the number of errors exceeding the error correction capabilities of the memory controller, may continue to be used by causing the memory controller to transition from its normal mode of operation to a safety mode of operation, where each code word generated by the memory controller has an increased ratio of ECC symbols to data symbols when compared with the normal mode of operation. Whilst such an approach reduces the effective data capacity of the memory device, it provides a safe operating mode for the memory device with increased reliability and stability.

Although particular embodiments have been described herein, it will be appreciated that the invention is not limited thereto and that many modifications and additions thereto may be made within the scope of the invention. For example, various combinations of the features of the following dependent claims could be made with the features of the independent claims without departing from the scope of the present invention.

We claim:

1. An apparatus for controlling access to a memory device configured to store code words, the apparatus comprising:
    encoding circuitry responsive to a write transaction to generate one or more code words for storage in the memory device, each code word comprising a plurality of symbols, said plurality of symbols comprising data symbols and associated error correction code (ECC) symbols;
    decoding circuitry responsive to a read transaction to decode one or more code words read from the memory device in order to generate read data for outputting in response to the read transaction, the decoding circuitry comprising error correction circuitry configured, for each read code word, to perform an error correction process to detect and correct errors in up to P symbols of said code word, where P is dependent on the number of ECC symbols in the code word; and
    error tracking circuitry configured to determine error quantity indication data indicative of the errors detected by the error correction circuitry;
    in response to the error quantity indication data indicating that an error threshold condition has been reached, the apparatus being caused to transition from a normal mode of operation to a safety mode of operation, in said safety mode of operation the encoding circuitry being configured such that the number of symbols in each code word generated by the encoding circuitry is no greater than in the normal mode of operation but each code word has a higher ratio of ECC symbols to data symbols than in said normal mode of operation.

2. An apparatus as claimed in claim 1, wherein said memory device comprises a plurality of memory regions, and the apparatus is configured to allocate a first subset of said memory regions for storing the data symbols of each code word and to allocate a second subset of said memory regions for storing the ECC symbols of each code word.

3. An apparatus as claimed in claim 2, wherein when the apparatus is caused to transition from said normal mode of operation to said safety mode of operation, the apparatus is configured to alter which memory regions are within said first subset and said second subset having regard to said higher ratio of ECC symbols to data symbols.

4. An apparatus as claimed in claim 2, wherein the error quantity indication data identifies error quantity information for each memory region, and if the error quantity indication data indicates that an error threshold condition has been reached, and identifies at least one memory region that is exhibiting a failure condition, that at least one memory region is excluded from use in the safety mode of operation.

5. An apparatus as claimed in claim 4, wherein in the safety mode of operation, the encoding circuitry is configured to generate a code word having the same number of symbols as in said normal mode of operation, with an ECC symbol being associated with each of said at least one excluded memory regions, and the ECC symbol associated with each of said at least one excluded memory regions not being written to the memory device.

6. An apparatus as claimed in claim 5, wherein when each code word is read from said memory device in said safety mode of operation, dummy data is added at the symbols positions associated with each of said at least one excluded memory regions, such that each code word decoded by the decoding circuitry has the same number of symbols as in said normal mode of operation.

7. An apparatus as claimed in claim 2, wherein said memory device comprises a plurality of memory chips, each memory chip forming one of said memory regions.

8. An apparatus as claimed in claim 1, wherein in said safety mode of operation the encoding circuitry is configured such that each code word generated by the encoding circuitry has half the number of data symbols as are provided within each code word generated by the encoding circuitry in the normal mode of operation.

9. An apparatus as claimed in claim 1, further comprising:
    mode control storage configured to store configuration data used to control operation of the apparatus, initial configuration data within the mode control storage causing the apparatus to operate in said normal mode of operation, but in response to the error quantity indication data indicating that said error threshold condition has been reached, the configuration data being updated within the mode control storage to cause the apparatus to enter said safety mode of operation.

10. An apparatus as claimed in claim 9, wherein:
    the error tracking circuitry is configured to output the error quantity indication data to control circuitry; and
    the mode control storage is configured to update said configuration data upon receipt of control signals from the control circuitry in response to the control circuitry determining that the error quantity indication data indicates that said error threshold condition has been reached.

11. An apparatus as claimed in claim 9, wherein:
    the error tracking circuitry is configured to determine when the error quantity indication data indicates that said error threshold condition has been reached, and upon such determination to output a trigger signal to control circuitry; and
    the mode control storage is configured to update said configuration data upon receipt of control signals generated by the control circuitry in response to the trigger signal.

12. An apparatus as claimed in claim 1, wherein:
    the error tracking circuitry is configured in said safety mode of operation to continue to maintain error quantity indication data indicative of the errors detected by the error correction circuitry;
    in response to the error quantity indication data indicating that a further error threshold condition has been reached, the apparatus being caused to transition from said safety mode of operation to a further safety mode of operation, in said further safety mode of operation the encoding circuitry being configured such that the number of symbols in each code word generated by the encoding circuitry is no greater than in the safety mode of operation but each code word has a higher ratio of ECC symbols to data symbols than in said safety mode of operation.

13. An apparatus as claimed in claim 12, wherein in said further safety mode of operation the encoding circuitry is configured such that each code word generated by the encoding circuitry has half the number of data symbols as are provided within each code word generated by the encoding circuitry in the safety mode of operation.

14. A method of controlling access to a memory device configured to store code words, the method comprising:
   generating, in response to a write transaction, one or more code words for storage in the memory device, each code word comprising a plurality of symbols, said plurality of symbols comprising data symbols and associated error correction code (ECC) symbols;
   decoding, in response to a read transaction, one or more code words read from the memory device in order to generate read data for outputting in response to the read transaction, the decoding step comprising, for each read code word, performing an error correction process to detect and correct errors in up to P symbols of said code word, where P is dependent on the number of ECC symbols in the code word;
   determining error quantity indication data indicative of the errors detected by the error correction process; and
   in response to the error quantity indication data indicating that an error threshold condition has been reached, transitioning the apparatus from a normal mode of operation to a safety mode of operation, in said safety mode of operation the encoding step being arranged such that the number of symbols in each generated code word is no greater than in the normal mode of operation but each code word has a higher ratio of ECC symbols to data symbols than in said normal mode of operation.

15. An apparatus for controlling access to a memory device configured to store code words, the apparatus comprising:
   encoding means, responsive to a write transaction, for generating one or more code words for storage in the memory device, each code word comprising a plurality of symbols, said plurality of symbols comprising data symbols and associated error correction code (ECC) symbols;
   decoding means, responsive to a read transaction, for decoding one or more code words read from the memory device in order to generate read data for outputting in response to the read transaction, the decoding means comprising error correction means for performing, for each read code word, an error correction process to detect and correct errors in up to P symbols of said code word, where P is dependent on the number of ECC symbols in the code word;
   error tracking means for determining error quantity indication data indicative of the errors detected by the error correction means;
   in response to the error quantity indication data indicating that an error threshold condition has been reached, the apparatus being caused to transition from a normal mode of operation to a safety mode of operation, in said safety mode of operation the encoding means generating code words such that the number of symbols in each generated code word is no greater than in the normal mode of operation but each code word has a higher ratio of ECC symbols to data symbols than in said normal mode of operation.

* * * * *